United States Patent
Rasanen et al.

[19]

[11] Patent Number: 6,128,322
[45] Date of Patent: *Oct. 3, 2000

[54] HIGH-SPEED DATA TRANSMISSION IN MOBILE COMMUNICATION NETWORKS

[75] Inventors: Juha Rasanen, Espoo, Finland; David Lin, Frisco, Tex.; Harri Honkasalo; Zhi-Chun Honkasalo, both of Bedford, Tex.

[73] Assignee: Nokia Telecommunications OY, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/675,898

[22] Filed: Jul. 5, 1996

Related U.S. Application Data

[63] Continuation-in-part of application No. PCT/FI96/00134, Mar. 6, 1996.

[30] Foreign Application Priority Data

Mar. 6, 1995 [FI] Finland ..................................... 951019

[51] Int. Cl.[7] ....................................................... H04J 13/04
[52] U.S. Cl. ........................... 370/536; 370/335; 370/468
[58] Field of Search ..................................... 370/536, 468, 370/465, 437, 310, 321, 337, 345, 442, 433, 431, 464, 473, 474, 535, 537, 538, 539, 540, 541, 542, 543, 544, 545; 375/259, 260, 335, 342

[56] References Cited

U.S. PATENT DOCUMENTS

| | | | |
|---|---|---|---|
| 4,383,316 | 5/1983 | Seidel | 370/536 |
| 4,860,283 | 8/1989 | Takano et al. | 370/356 |

(List continued on next page.)

FOREIGN PATENT DOCUMENTS

| | | |
|---|---|---|
| 382 363 | 8/1990 | European Pat. Off. |
| 0534493A2 | 3/1993 | European Pat. Off. |
| 534 493 | 3/1993 | European Pat. Off. |
| WO 90/08434 | 7/1990 | WIPO |
| 91/14319 | 9/1991 | WIPO |

OTHER PUBLICATIONS

International Telecommunications Union, The Internat'l Telegraph Consultative Committee, "Data Communication Over the Telephone Network", "A Duplex Modem Operating at Data Signalling Rates of Up to 14,400 bit/s For Use on the General Switched Telephone Network and on Lease To–Point–Point 2–Wire Telephone–Type Circuits", Geneva, 1881, Recommendation V.32 Bis, pp. 1 to 22.

(List continued on next page.)

*Primary Examiner*—Huy D. Vu
*Attorney, Agent, or Firm*—Pillsbury Madison & Sutro Intellectual Property

[57] ABSTRACT

For high-speed data transmission in a digital mobile system, the mobile network allocates n parallel rate-adapted traffic channels to a high-speed user data signal which requires a data transfer rate $R_{user}$ within a range $(n-1)*R_{ch} < R_{user} < n*R_{ch}$, wherein $R_{ch}$ is the maximum transmission rate of a single traffic channel. The user data signal is divided in the transmitter into transmission frames (L, L+1, L+2) for transmission via the parallel traffic channels (ch1–chn) in such a way that all the information bits in the transmission frames of n−1 traffic channels carry user data bits (DATA), and the user data transfer rate of each of the n−1 traffic channels is $R_{ch}$. In the frames of the nth traffic channel (chn) the number of the information bits carrying user data bits (DATA) is selected to correspond to the user data rate $R_{user}-(n-1)*R_{ch}$ exceeding the capacity of the other n−1 traffic channels. The remaining information bits in the frames of the nth traffic channel carry stuff bits (FILL).

15 Claims, 7 Drawing Sheets

U.S. PATENT DOCUMENTS

| | | | |
|---|---|---|---|
| 5,005,170 | 4/1991 | Nelson | 370/535 |
| 5,050,166 | 9/1991 | Cantoni et al. | 370/474 |
| 5,065,396 | 11/1991 | Castellano et al. | 370/536 |
| 5,208,804 | 5/1993 | Wilson et al. | 375/260 |
| 5,231,649 | 7/1993 | Duncanson | 375/260 |
| 5,291,515 | 3/1994 | Uchida et al. | 370/479 |
| 5,293,378 | 3/1994 | Shimizu | 370/536 |
| 5,373,502 | 12/1994 | Turban | 370/442 |
| 5,442,625 | 8/1995 | Gitlin et al. | 370/468 |
| 5,459,720 | 10/1995 | Iliev et al. | 370/389 |
| 5,483,531 | 1/1996 | Jouin et al. | 370/465 |
| 5,483,534 | 1/1996 | Ohki et al. | 370/536 |
| 5,528,579 | 6/1996 | Wadman et al. | 370/522 |
| 5,583,851 | 12/1996 | Kato et al. | 370/468 |
| 5,680,400 | 10/1997 | York | 370/536 |
| 5,956,332 | 9/1999 | Rasanen et al. | 370/342 |

OTHER PUBLICATIONS

Internat'l Telecommunication Union, The Internat'l Telegraph and Telephone Consultative Committee, "Data Communication Over the Telephone Network", Support by An ISDN of Data Terminal Equipment with V–Series Type Interfaces With Provision For Statistical Multiplexing, Aug. 1982, Recommendation V.120, pp. 1 to 36.

ETSI/PT 12, "Recommendation GSM 08.60", "Inband Control of Remote Transcoders and Rate Adoptors", Oct. 1990, pp. 3 to 28.

"An Overview of the Application Code Division Multiple Access (CDMA) to Digital Cellular Systems and Personal Cellular Networks", May 21, 1992.

| OCTET NO. | BIT NUMBER | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | E1 | E2 | E3 | E4 | E5 | E6 | E7 |
| 6 | 1 | D25 | D26 | D27 | D28 | D29 | D30 | S6 |
| 7 | 1 | D31 | D32 | D33 | D34 | D35 | D36 | X |
| 8 | 1 | D37 | D38 | D39 | D40 | D41 | D42 | S8 |
| 9 | 1 | D43 | D44 | D45 | D46 | D47 | D48 | S9 |

|  | FRAME L | FRAME L+1 | FRAME L+2 |  |
|---|---|---|---|---|
| ch1 | DATA | DATA | DATA | ... |
| ⋮ | | | | |
| ch(n-1) | DATA | DATA | DATA | ... |

| chn | DATA | FILL | DATA | FILL | DATA | FILL | ... |
|---|---|---|---|---|---|---|---|

FIG. 5

|  | FRAME L | FRAME L+1 |  |
|---|---|---|---|
| ch1 | 48 DATA BITS | 48 DATA BITS | ... |
| ⋮ | | | |
| ch5 | 48 DATA BITS | 48 DATA BITS | ... |

| ch6 | 40 DATA BITS + 8 STUFF BITS | 40 DATA BITS + 8 STUFF BITS | ... |
|---|---|---|---|

$R_{user}$ = 56 Kbps $R_{user}$ = 9.6 Kbps

FIG. 6

HIGH-SPEED DATA TRANSMISSION IN MOBILE COMMUNICATION NETWORKS

RELATED APPLICATIONS

This is a continuatiation-in-part (CIP) of International PCT Application PCT/FI96/00134, filed on Mar. 6, 1996.

FIELD OF THE INVENTION

The invention relates to high-speed data transmission in digital mobile communication networks.

BACKGROUND OF THE INVENTION

There are several multiple access modulation techniques for facilitating communications in which a large number of mobile user are present. These techniques include time division multiple access (TDMA), code division multiple access (CDMA) and frequency division multiple access (FDMA).

In TDMA radio telecommunication systems, the communication on the radio path is time-divisional and occurs in successive TDMA frames each of which consists of several time slots. A short information packet is transmitted in each time slot in the form of a radio-frequency burst that has a limited duration and that consists of a number of modulated bits. The time slots are primarily used for conveying control and traffic channels. The traffic channels are used for transferring speech and data. The control channels are for signalling between a base station and mobile stations. An example of a TDMA radio system is the Pan-European digital mobile system GSM (Global System for Mobile Communications). CDMA is a modulation and multiple access scheme based on spread spectrum communication. Unlike FDMA or TDMA, in CDMA a large number of CDMA signals (users) simultaneously share the same wide band radio channel, typically 1.25 MHz. Pseudorandom noise (PN) binary codes, so called spreading codes, are used to distinguish between different CDMA signals, i.e traffic channels on said wide band radio channel. A separate spreading code is used over each connection between a base station and a subscriber terminal. In other words, the narrow-band data signal of the user is conventionally multiplied by the dedicated spreading code and thereby spread in bandwidth to the relatively wide band radio channel. The signals of the users can be distinguished from one another in the receivers on the basis of the unique spreading code of each connection, by using a correlator which accepts only a signal energy from the selected spreading code and despreads its spectrum into a narrow-band signal. The other users' signals, whose spreading codes do not match, are not despread in bandwidth and as a result, contribute only to the noise and represent a self-interference generated by the system. The spreading codes of the system are preferably selected in such a way that the codes used in each system cell are mutually orthogonal, i.e. they do not correlate with each other. Thus, in the CDMA systems, the spreading code unique to each user or user' signal provides a traffic channel in a similar sense as a time slot in the TDMA systems. CDMA is described in more detail in the document: "An overview of the application of code division multiple access (CDMA) to digital cellular systems and personal cellular networks", Qualcomm Incorporated, 1992, USA, (Document Number EX60-10010).

In traditional TDMA and CDMA mobile communications systems, the maximum data rate at the radio interface is relatively low.

In conventional mobile systems, one traffic channel time slot is allocated for communication to each mobile station for the transmission of data or speech. For example the GSM system may therefore comprise as many as eight parallel connections to different mobile stations on a radio frequency carrier. The maximum data transfer rate on one traffic channel is limited to a relatively slow level, e.g. in the GSM system 9.6 Kbps or 12 Kbps, according to the available bandwidth and the channel coding and error correction employed in the transmission. In the GSM system, a so-called half-rate (max. 4.8 Kbps) traffic channel can also be selected for low speech coding rates. The half-rate traffic channel is established when a mobile station operates in an assigned time slot only in every other frame, i.e. at half the rate. Another mobile station operates in the same assigned time slot of every other frame. The system capacity, measured in the number of mobile subscribers, can thus be doubled, i.e. as many as 16 mobile stations can operate on the carrier frequency simultaneously.

In recent years, the need for high-speed data services in mobile networks has increased considerably. For example transmission rates of at least 64 Kbps would be required for the ISDN (Integrated Services Digital Network) circuit-switched digital data services. The data services of the public switched telephone network (PSTN), for example a modem and G3-type telefax terminals, require higher transmission rates such as 14.4 Kbps. One of the increasing areas of mobile data transmission that requires transmission rates exceeding 9.6 Kbps is mobile video services. Examples of such services include security surveillance by means of cameras, and video databases. The minimum data rate in video transmission may be for example 16 or 32 Kbps.

The transmission rates of the present mobile networks are not sufficient for meeting these new requirements, however.

An arrangement, disclosed in Applicant's co-pending international patent application WO95/31878, (unpublished on the filing date of the present application), relates to allocating two or more parallel traffic channels (subchannels) on the radio path for one high-speed data connection. The high-speed data signal is divided in the transmitter into these parallel subchannels for the transmission over the radio path, to be restored in the receiver. This approach enables the supply of data transmission services with as high as eight-fold transmission rate compared to the conventional rate, depending on the number of the traffic channels allocated. For example in the GSM system, the total user data rate of 19.2 Kbps is obtained by two parallel 9.6 Kbps subchannels, each channel being rate-adapted in the same manner as in the existing transparent 9.6 Kbps bearer services of the GSM system.

A problem relating to the use of parallel traffic channels is the data rates which cannot be rate-adapted with the existing methods of the mobile communications system even though these data rates can be evenly distributed between the available parallel subchannels.

In the GSM system, for example, the user data rate of 14.4 Kbps (according to e.g. ITU-T Recommendation V.32bis) requires two transparent GSM traffic channels the data rate in each of which should be 7.2 Kbps (2×7.2 Kbps=14.4 Kbps), but there is no rate adaptation in the GSM system for the subchannel data rate of 7.2 Kbps.

Correspondingly, for example the user data rate of 40 Kbps (ITU-T Recommendation V.120) requires five transparent GSM traffic channels in each of which the data rate should be 8 Kbps (40 Kbps: 5), but there is again no rate adaptation in the GSM system for such a subchannel data rate.

Another problem is the data rates that cannot be evenly divided into a required number of traffic channels. In the GSM system, for example, the user data rate of 56 Kbps (ITU-T Recommendation V.110) requires at least six transparent GSM traffic channels, but it cannot be divided into these six parallel subchannels in such a way that the (V.110) frames of each subchannel carry the same number of data bits (56 Kbps: 6=9333.333 bps).

SUMMARY OF THE INVENTION

An object of the present invention is to provide a method and a telecommunication system which support the rata adaptation of different transmission rates in high-speed data transmission utilizing parallel traffic channels.

A first aspect of the invention is a method for high-speed data transmission over an air interface between a mobile station and a fixed mobile communication network in a digital mobile communication system, said method comprising steps of allocating n parallel rate-adapted traffic channels to a high-speed user data signal, which requires a data rate $R_{user}$ within a range $(n-1)*R_{ch}<R_{user}<n*R_{ch}$, wherein $R_{ch}$ is the maximum transmission rate of any one of said traffic channels, and n=2,3, . . . , dividing the high-speed user data signal into transmission frames for transmission via said parallel traffic channels in such a way that all the information bits in the transmission frames of n−1 traffic channels carry user data bits, and the user data transfer rate of each of said n−1 traffic channels being $R_{ch}$, and a number of the information bits carrying user data bits in transmission frames of said nth traffic channel corresponds to the user data transfer rate $R_{user}-(n-1)*R_{ch}$ left over from the other n−1 traffic channels, and the remaining information bits in the transmission frames of said nth traffic channel carry stuff bits, transmitting said transmission frames over the radio path between a mobile station and a fixed mobile network through said allocated rate-adapted traffic channels.

A second aspect of the invention is a digital mobile communication system, comprising at least one mobile station having a data transmitter and a data receiver, a mobile communications network having a data transmitter and a data receiver, the mobile network being arranged to allocate n parallel rate-adapted traffic channels to a mobile station for transmission of a high-speed data signal over an air interface between said mobile station and said mobile communication network, when a data transfer rate $R_{user}$ required by said high speed data signal is within range $(n-1)*R_{ch}<R_{user}<n*R_{ch}$, wherein $R_{ch}$ is the maximum transmission rate of an individual traffic channel and n=2,3, . . . , said data transmitters being arranged to divide the high-speed user data signal into transmission frames for transmission via said allocated parallel traffic channels in such a way that all the information bits in the transmission frames of n−1 traffic channels carry user data bits, and the user data transfer rate of each of said n−1 traffic channel being $R_{ch}$, and a number of the information bits carrying user data bits in the transmission frames of the nth traffic channel corresponds to the user data transfer rate $R_{user}-(n-1)*R_{ch}$ left over from the other n−1 traffic channels, and the remaining information bits in the transmission frames of said nth traffic channel carry stuff bits.

According to the present invention, if a high-speed user data signal requires the capacity of n traffic channels, the user data is divided into traffic channels in such a way that the capacity of n−1 traffic channels is used completely, i.e. each information bit in each transmission frame carries user data. The remainder of the user data (the user data exceeding the capacity of n−1 channels) is carried in a required number of information bits of the frames on the nth traffic channel. The remaining "extra" information bits on the last-mentioned traffic channel carry stuff bits.

Therefore the transmission frames of all traffic channels contain a fixed number of information bits independently of the data rate of the high-speed signal to be transmitted. The number of the information bits is such that the data rate of the frame is fixed and corresponds to the standard rate adaptation of a traffic channel in the mobile communication system, e.g. 9.6 Kbps in the GSM system. Due to the invention, all user transmission rates that have already been and that will be standardized can be transferred via mutually identical traffic channels that have been rate-adapted to one transmission rate, by performing a further rate adaptation within a single traffic channel. The rate adaption of a high-speed user data signal requires changes in the frames of only one traffic channel, and these changes concern the selection of the relative proportion of user data bits and stuff bits to correspond to the transmission rate that is left over from the other traffic channels. The other parallel traffic channels carry a full amount of user data and are therefore completely standard rate-adapted traffic channels.

For example in the GSM system, it is possible to use a standard 9.6 Kbps rata-adapted transparent traffic channel and a transmission frame of 48 information bits according to the CCITT Recommendation V.110. In such a case, different user data rates between 0 and 9.6 Kbps can be transmitted through a 9.6 Kbps rate-adapted traffic channel by varying the number of the information bits used for the user data transmission between 0 and 48 in the V.110 frame.

The centralization of stuff bits in one traffic channel enables the transmission at any standard data rate. Distributing the user data bits and the stuff bits evenly into traffic channels would not be possible with all standard transmission rates, such as 56 or 64 Kbps, but "fragments" of bits would have to be transmitted in the frames. In practice, this would require a long user data buffer in the transmission. In the invention, a fixed number of user data bits and stuff bits are transmitted even on the last traffic channel, wherefore no separate buffering is needed and the above-described problem is not encountered.

BRIEF DESCRIPTION OF THE DRAWINGS

In the following, the invention will be described by means of preferred embodiments with reference to the accompanying drawings, in which:

FIG. 5 illustrates the data transmission according to the invention in the frames of n parallel traffic channels, FIG. 6 illustrates the adaptation of the user rate of 56 Kbps to six 9.6 Kbps traffic channels according to the invention.

DETAILED DESCRIPTION OF PREFERRED EMBODIMENTS OF THE INVENTION

The present invention can be applied to a high-speed data transmission in digital mobile communication systems utilizing various multiple access methods, such as TDMA or CDMA. In different multiple access methods the physical concept of traffic channel varies, being primarily defined by a time slot in TDMA systems, a spreading code in CDMA systems, a radio channel in FDMA systems, a combination thereof, etc. The basic concept of the present invention is, however, independent of the type of the traffic channel and the multiple access method used.

Figures 1, 4:
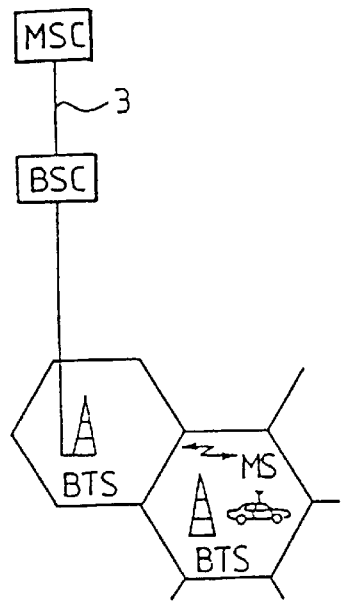
FIG. 1 illustrates a part of a mobile system wherein the invention can be applied.
FIG. 4 shows the V.110 frame structure.

Examples of mobile communications systems include the Pan-European digital mobile communication system GSM, DCS1800 (Digital Communication System), the mobile communication system according to the EIA/TIA Interim Standard IS/41.3, etc. The invention will be illustrated below by using as an example a GSM-type mobile system, without being restricted thereto, however. FIG. 1 introduces very briefly the basic structural components of the GSM system, without describing their characteristics or the other elements of the system. For a more detailed description of the GSM system, reference is made to the GSM recommendations and to *"The GSM System for Mobile Communications"* by M. Mouly and M. Pautet (Palaiseau, France, 1992, ISBN:2-9507190-07-7).

A mobile services switching centre controls the switching of incoming and outgoing calls. It performs similar functions as the exchange of the PSTN. Further, it also performs, together with the network subscriber registers, functions, such as location management, that are only characteristic of mobile telephone traffic. Mobile stations MS are connected to the MSC via base station systems BSS. A base station system BSS consists of a base station controller BSC and base stations BTS. For the sake of clarity, FIG. 1 only shows a base station system wherein two base stations are connected to the base station controller BSC and wherein one mobile station MS is located within the coverage area of the base stations.

The GSM system is a time division multiple access (TDMA) type system. The channel structures used in the radio interface are defined in greater detail in the ETSI/GSM recommendation 05.02. During normal operation, one time slot is allocated from a carrier frequency to a mobile station MS as a traffic channel in the beginning of a call (single slot access). The mobile station MS is synchronized with the allocated time slot to transmit and receive radio-frequency bursts. During the remaining time of the frame, the MS performs different measurements. The Applicant's co-pending patent applications WO95/31878 and PCT/FI95/00673 disclose a method wherein two or more time slots are allocated to a mobile station MS which requires data transmission with a higher rate than what one traffic channel can provide. As regards the details of this procedure, reference is made to the aforementioned patent applications.

In the following, the procedure will be described with reference to FIG. 2 only as one way of carrying out high-speed data transmission, based on several parallel traffic channels, in a radio system. It should be noted, however, that the only matter essential for the invention is that a connection comprising several parallel traffic channels is established, and the invention itself relates to carrying out and synchronizing data transmission over such a connection.

Figure 2:
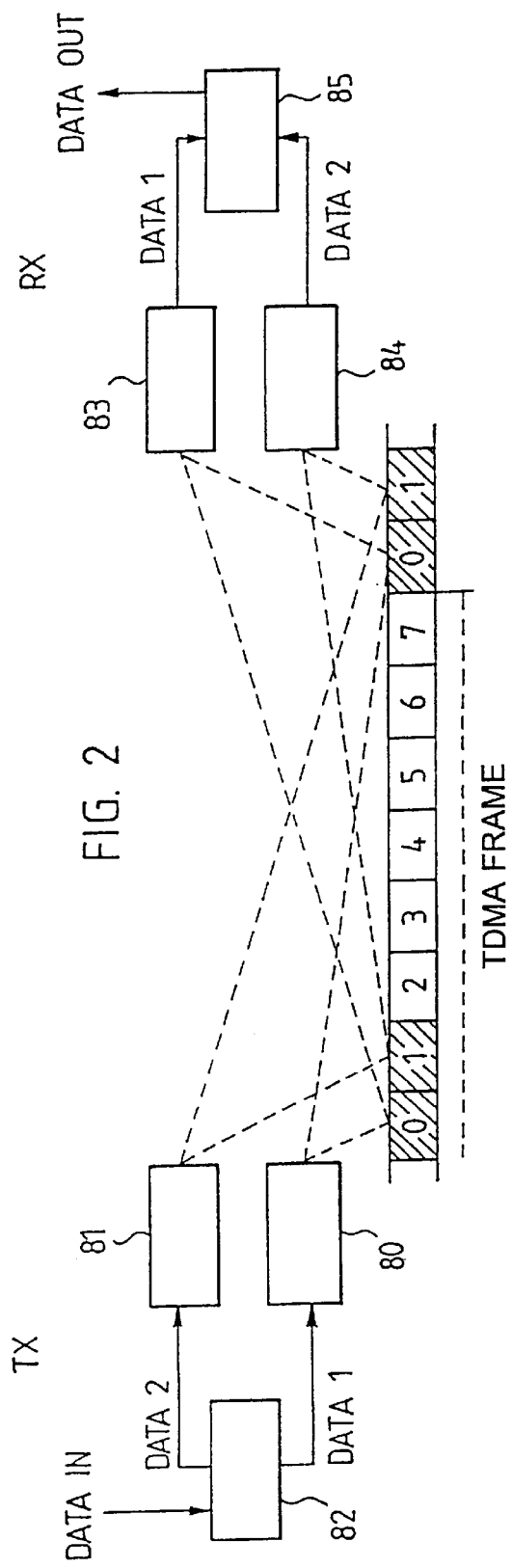
FIG. 2 illustrates high-speed data transmission in two TDMA time slots over the radio path.

FIG. 2 shows an example wherein successive time slots 0 and 1 are allocated to a mobile station MS from a single TDMA frame. A high-speed data signal DATAIN, which is to be transmitted over the radio path, is divided in a divider 82 into a required number of lower-speed data signals, namely DATA1 and DATA2. Each lower-speed data signal DATA1 and DATA2 is separately subjected to channel coding, interleaving, burst formation and modulation 80 and 81, respectively, whereafter each lower-speed data signal is transmitted as a radio-frequency burst in a dedicated time slot 0 and 1, respectively. When the lower-speed data signals DATA1 and DATA2 have been transmitted over the radio path through different traffic channels, they are separately subjected in the receiver to demodulation, deinterleaving and channel decoding 83 and 84, respectively, whereafter the signals DATA1 and DATA2 are again combined in a combiner 85 of the receiver into the original high-speed signal DATAOUT.

Figure 3:
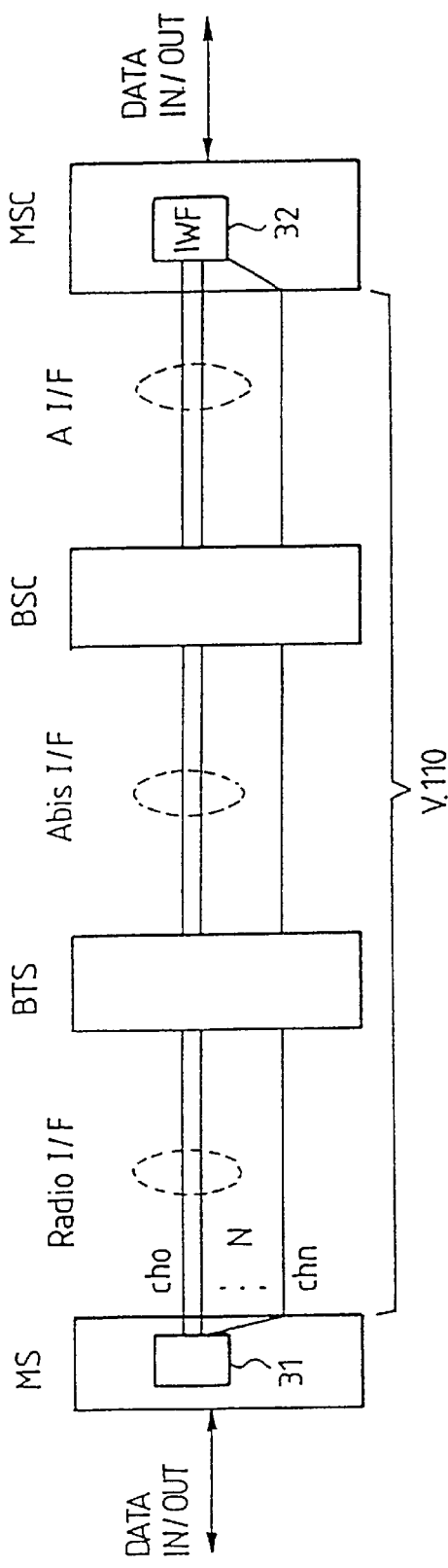
FIG. 3 illustrates the network architecture according to the invention, which supports the high-speed data transmission of several traffic channels between a mobile station MS and an interworking function IWF in the GSM system.

FIG. 3 is a block diagram illustrating the GSM network architecture which implements such data transmission using several parallel traffic channels. The functions of the blocks 80, 81, 83 and 84 of FIG. 3, i.e. channel coding, interleaving, burst formation and modulation, and correspondingly demodulation, deinterleaving and channel decoding are situated on the side of the fixed network preferably at the base station BTS. The above-described TDMA frame is thus transmitted between the base station BTS and the mobile station MS in a radio interface Radio I/F. Each time slot is subjected to separate parallel processing at the base station BTS. The divider 82 and the combiner 85 of FIG. 2 may be located in the fixed network side remote from the base station BTS in another network element, such as BSC, whereupon the lower-speed data signals DATA1 and DATA2 are transmitted between this network element and the base station in the same way as the signals of normal traffic channels. In the GSM system, this communication takes place in TRAU frames according to the ETSI/GSM recommendation 08.60 between the base station BTS and a special transcoder/rateadapter unit (TRCU). The TRAU frames and the transmission associated thereto are not essential for the invention, since the invention relates to carrying out and synchronizing data transmission over the entire data connection utilizing several parallel traffic channels, i.e. between the divider 82 and the combiner 85.

In the GSM system, a data link is formed between a terminal adapter 31 in the mobile station MS and an interworking function IWF 32 in the fixed network. In data transmission occurring in the GSM network, this connection is a V.110 rate-adapted, UDI-coded digital 9.6 Kbps full-duplex connection that is adapted to V.24 interfaces. The V.110 connection described herein is a digital transmission channel that was originally developed for ISDN (Integrated Services Data Network) technology, that is adapted to the V.24 interface, and that also provides the possibility of transmitting V.24 statuses (control signals). The CCITT recommendation for a V.110 rate-adapted connection is disclosed in the CCITT Blue Book: V.110. The CCITT recommendation for a V.24 interface is disclosed in the CCITT Blue Book: V.24. The terminal adapter 31 adapts the data terminal connected to the mobile station MS to a V.110 connection, which is established over a physical connection utilizing several traffic channels ch0 to chN. The IWF couples the V.110 connection to another V.110 network, such as an ISDN or another GSM network, or to some other transit network, such as the public switched telephone network PSTN. In the first case, the IWF only contains the divider/combiner 82/85 according to the invention. In the last-mentioned case, the IWF also contains for example a baseband modem by means of which data transmission is performed through the PSTN.

The frame structure used for data transmission on a V.110 connection (9.6 Kbps) is shown in FIG. 4. The frame comprises 80 bits. Octet 0 contains binary zeroes, whereas octet 5 contains a binary one which is followed by seven E bits. Octets 1 to 4 and 6 to 9 comprise a binary one in bit position 1, a status bit (S or X bit) in bit position 8, and 6 data bits (D bits) in bit positions 2 to 7. The bits are transmitted from left to right and from top to bottom. The frame thus comprises 48 information bits D1 to D48 (user data). Bits S and X are used to transmit channel control information associated to the data bits in the data transmission mode.

As described above, the problem with such high-speed data transmission is the data rates which cannot be rate-adapted with the present methods of the telecommunications systems. For example in the GSM system, such rates include all data rates that are not multiples of 9.6 Kbps.

This is solved in the invention by dividing a high-speed user data signal in the transmitter into parallel traffic channels in such a way that the full capacity of as many traffic channels as possible is first used for the transmission of user data, whereafter the user data that is left over from these "full rate" traffic channels is transmitted on one "lower rate" traffic channel together with stuff bits. This method according to the invention will be described generally below.

Assume that the data transfer rate $R_{user}$ required by a high-speed user data signal and arriving at a divider 82 in FIG. 2 is in the range $(n-1)*R_{ch}<R_{user}<n*R_{ch}$, wherein $R_{ch}$ is the maximum transmission rate of an individual traffic channel, and the integer $n \geq 2$. In such a case, the signal DATA IN requires n parallel traffic channels which are allocated by the fixed network (e.g. MSC). The divider 82 divides the data signal DATA IN into the transmission frames which will then be transmitted via the allocated parallel traffic channels in a manner illustrated in FIG. 5. All the information bits in the transmission frames of traffic channels ch1, ch2 and ch(n-1) are user data bits, whereupon the transmission rate of the user data is $R_{ch}$ on all these traffic channels. Therefore the traffic channels ch1, ch2, ch(n-1) carry the user data at the total transmission rate of $(n-1)*R_{ch}$. The information bits of the last traffic channel chn comprise user data bits DATA only in an amount corresponding to the user data transfer rate $R_{user}-(n-1)*R_{ch}$ left over from the other traffic channels, and the rest of the information bits are stuff bits FILL. The frames are transmitted via transmitters 80 and 81 to receivers 83 and 84, and combined in a combiner 85 to provide a high-speed user data signal DATA OUT. The traffic channels between the divider 82 and the combiner 85 may then be standard rate-adapted and mutually identical traffic channels. Therefore, it is not necessary to introduce new rate adaptation into the mobile system separately for each standard user transmission rate.

The application of the present invention to the GSM system will be described below. It is then assumed that rate-adapted transparent full-rate 9.6 Kbps traffic channels are used as the parallel traffic channels, and V.110 frames of FIG. 4 are transmitted on the traffic channels. A frame then comprises 48 information bits D1 to D48.

A few examples of the adaptation of high-speed data to such a V.110 frame of a GSM traffic channel will be examined below.

EXAMPLE 1

Assume that the user data rate $R_{user}$=56 Kbps, whereupon six parallel GSM traffic channels are needed ($R_{ch}$=9.6 Kbps). The rate adaptation according to the invention may then be carried out as shown in FIG. 6. All the 48 information bits D1 to D48 in each V.110 frame on traffic channels ch1, ch2, ch3, ch4 and ch5 carry user data, whereupon the user data rate on each of these channels is 9.6 Kbps. Therefore the total transmission rate of the channels ch1 to ch5 is 5*9.6 Kbps=48 Kbps. The remaining user transmission rate is thus 56–48 Kbps=8 Kbps, which is transmitted on the last traffic channel ch6. This is carried out in such a way that 40 information bits (e.g. D1 to D40) in each V.110 frame on traffic channel ch6 carry user data bits and 8 information bits (e.g. D41 to D48) carry stuff bits. In this manner, a 56 Kbps signal can be transmitted through six GSM traffic channels.

EXAMPLE 2

Assume that the user data rate $R_{user}$=14.4 Kbps. Two traffic channels ($R_{ch}$=9.6 Kbps) are then needed. In such a case, all the information bits D1 to D48 of the V.110 frame on the first traffic channel carry user data bits, whereupon the transmission rate is 9.6 Kbps. The remaining data rate, i.e. 14.4–9.6 Kbps=4.8 Kbps, is adapted to the second traffic channel in such a way that 24 information bits (e.g. D1 to D24) in each V.110 frame carry user data and 24 information bits (e.g. D25 to D48) carry stuff bits.

EXAMPLE 3

Assume that the user data rate $R_{user}$=26.4 Kbps, whereupon three traffic channels ($R_{ch}$=9.6 Kbps) are needed. In such a case, all the information bits D1 to D48 in the V.110 frames of two traffic channels carry user data. The total transmission rate of these two traffic channels is then 19.2 Kbps. The remaining user data rate, i.e. 26.4–19.2 Kbps=7.2 Kbps, is adapted to a third channel in such a way that 36 information bits (e.g. D1 to D36) of each V.110 frame carry user data and 12 information bits (e.g. D37 to D48) carry stuff bits.

EXAMPLE 4

Assume that the user data rate $R_{user}$=38.4 Kbps, whereupon four traffic channels ($R_{ch}$=9.6 Kbps) are needed. Since the user data rate is divided evenly into four traffic channels in such a way that the total capacity of all the traffic channels is used, no stuff bits being needed on any traffic channel.

As noted above the present invention is universally applicable on various kinds of multiple access methods and traffic channels. In CDMA systems the traffic channels are defined by pseudorandom noise (PN) codes, i.e. spreading codes, assigned to each user or connection. From the present invention point of view the CDMA traffic channel is similar to the TDMA traffic channel. The basic contribution of the present invention is to provide an universal rate adaptation for different transmission rates in high-speed data transmission utilizing parallel traffic channels in a manner described with reference to FIGS. 5 and 6, for example.

Figure 7:
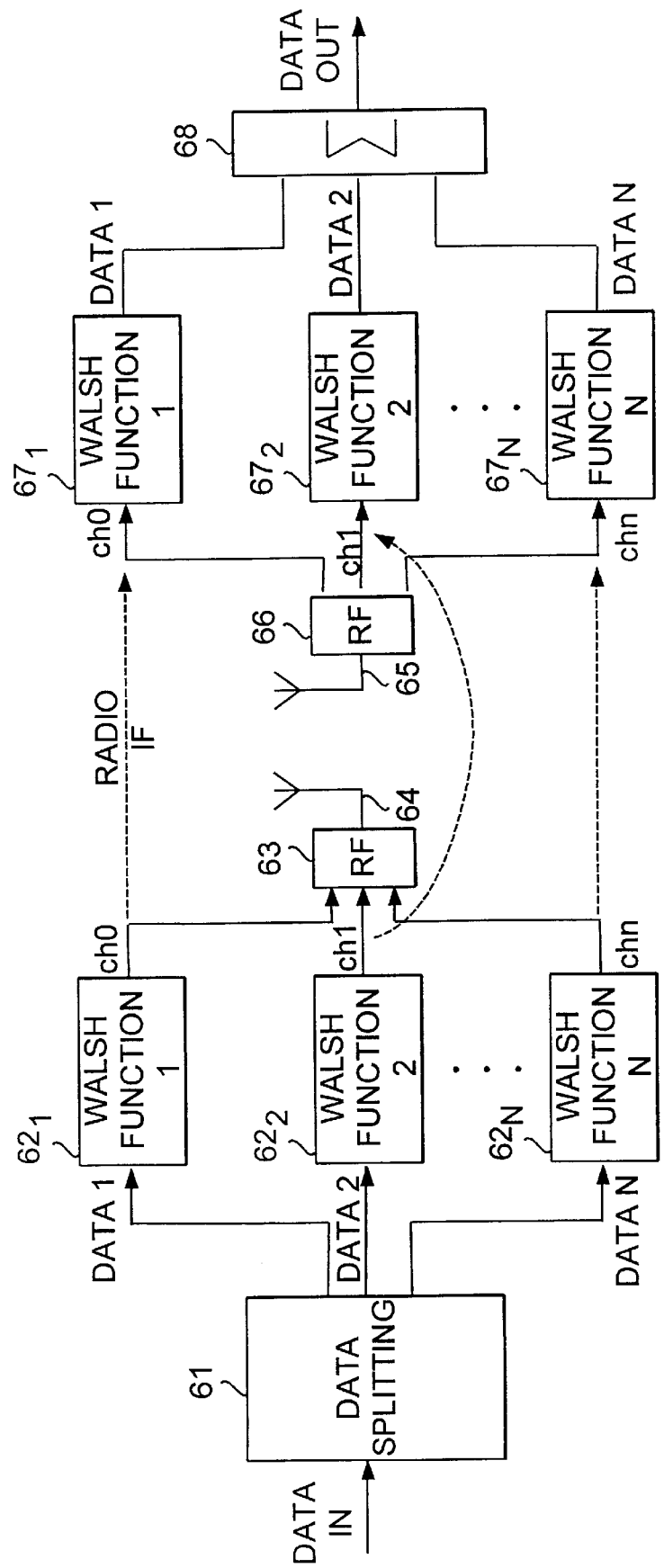
FIGS. 7, 8A and 8B illustrate a high-speed data transmission according to the present invention over N parallel CDMA traffic channels.

High-speed data transmission according to the present invention over N parallel CDMA traffic channels is illustrated in FIG. 7. A high-speed data signal DATAIN that is to be transmitted over the radio path is divided in a data splitter 61 into the required number of slower-speed data signals DATA1 . . . DATAN. A respective number N of parallel CDMA traffic channels ch0 . . . chn is allocated for the transmission. In other words, an unique spreading code is allocated for each slower-speed signal DATA1 . . . DATAN in order to distiquish them from each other during simultaneous transmission over the radio interface. The spreading codes of the system are preferably selected in such a way that the codes used in each system cell are mutually orthogonal, i.e. they do not correlate with each other. One class of suitable orthogonal binary sequences is called the Walsh function. In the embodiment shown in FIG. 7 the traffic channel separation is done by coding (multiplying) each lower-speed data stream DATA1 . . . DATAN by modified Walsh functions 1 . . . N of lenght 255 in respective Walsh encoders $62_1$ . . . $62_N$, in order to spread the data streams in bandwidth. The Walsh function is modified so that a last bit of all of the functions have been deleted. The spread-spectrum data streams are fed to through radio frequency (RF) parts 63 to an antenna 64 for transmission over the radio interface.

The RF signal received at receiving antenna 65 is fed through radio frequency (RF) parts 66 and split in parallel to correlator branches $67_1$ . . . $67_N$. Correlators $67_1$. . . $67_N$ are Walsh decoders each of which decodes (multiplies) the received spread-spectrum signal by the Walsh function 1 . . . N of the respective CDMA traffic channel ch0 . . . chn, in order to despread the signal in bandwidth and to restore the original bandwidth of the respective slow-speed data stream DATA1 . . . DATAN. The restored slow-speed data streams DATA1 . . . DATAN are combined in a combiner 68 into a high-speed data stream DATAOUT.

The rate adaptation n according to the present invention in a high-speed data transmission through the parallel CDMA traffic channels can thus be carried out in a manner shown in FIGS. 5 and 6, for example.

Typically, there are various coding and signal processing operations, such as channel coding (convolutional coding), symbol repetition, interleaving, etc., involved with the data transmission. These additional operations are not essential in the point of view of the present invention. In the embodiment of FIG. 7, it is assumed that these coding and interleaving operations, if any, are done to the high-speed data streams DATAIN and DATAOUT prior to the data splitting 61 and subsequent to data combining 68.

Figure 8A:
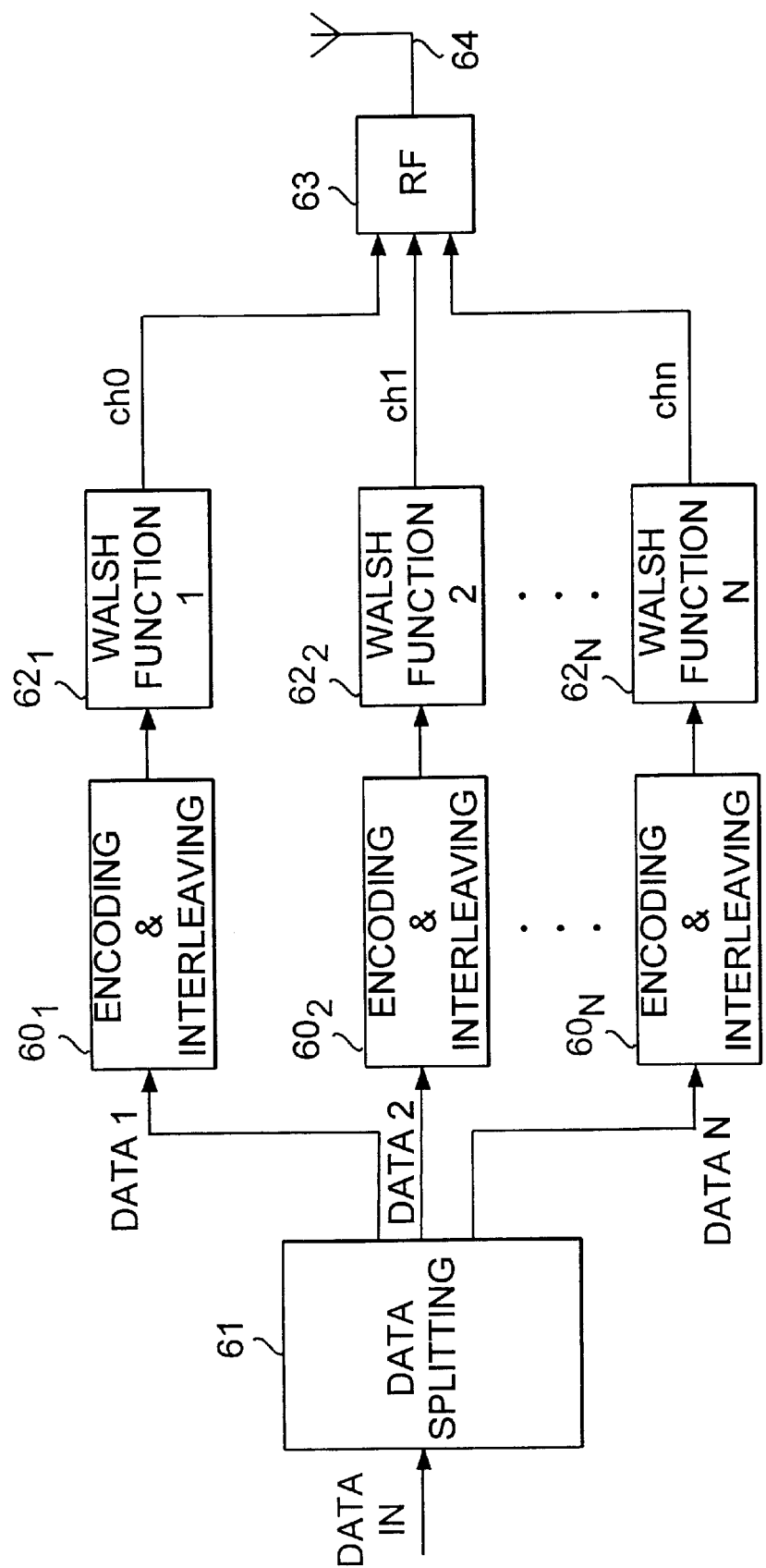
Figure 8B:
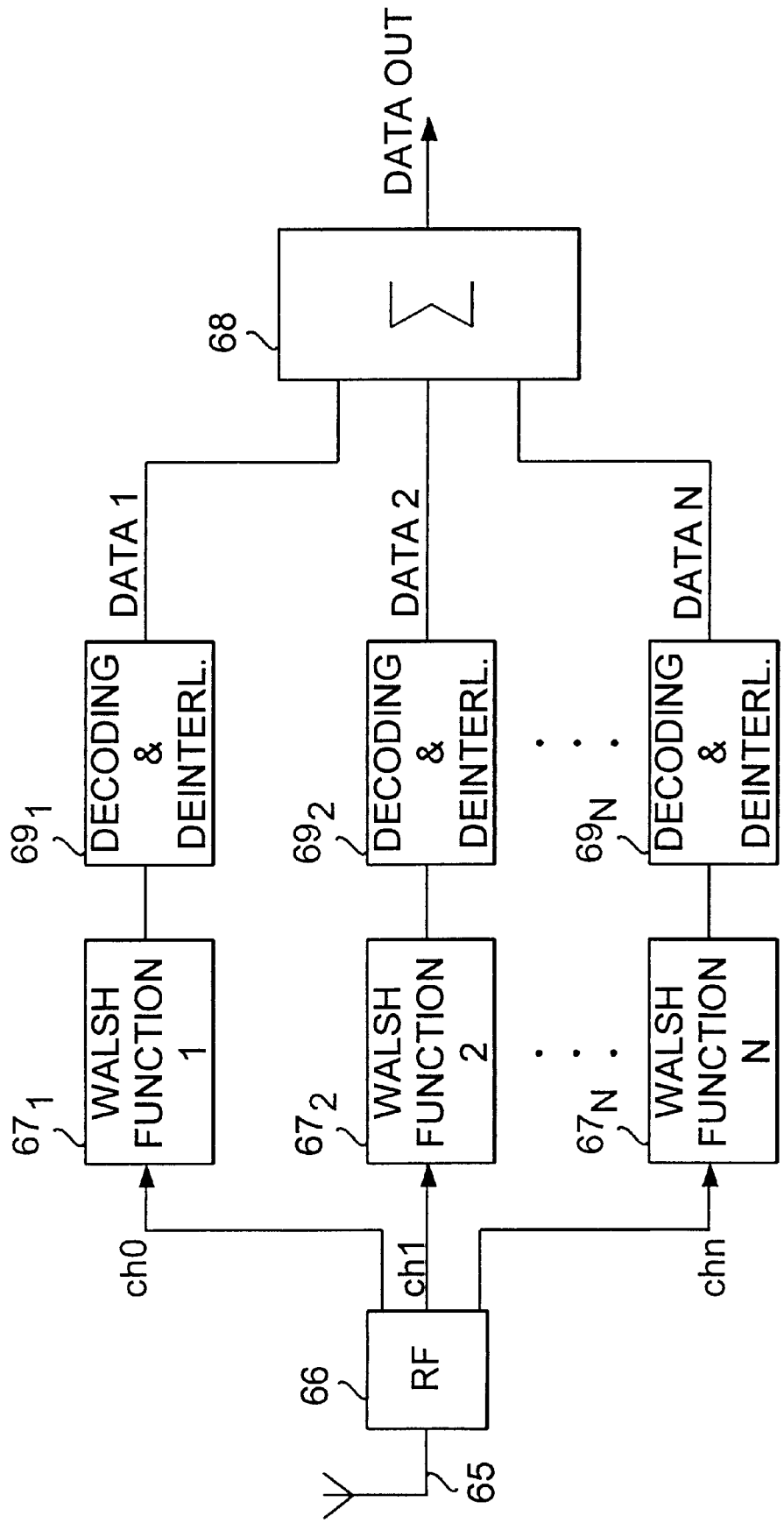

In another embodiment illustrated in FIGS. 8A and 8B, the channel coding, interleaving and other additional operations are done separately on each slow-speed data stream DATA1 . . . DATAN. To this end, encoding and interleaving blocks $60_1$ . . . 60N are provided between the data splitter 61 and the Walsh encoders $62_1$ . . . . $62_N$ in the transmitter of FIG. 8A. Similarly, decoding and deinterleaving blocks $69_1$ . . . 69N are provided between the Walsh decoders $67_1$ . . . $67_N$ and the data combiner 68 in the receiver of FIG. 8B.

Figure 9:
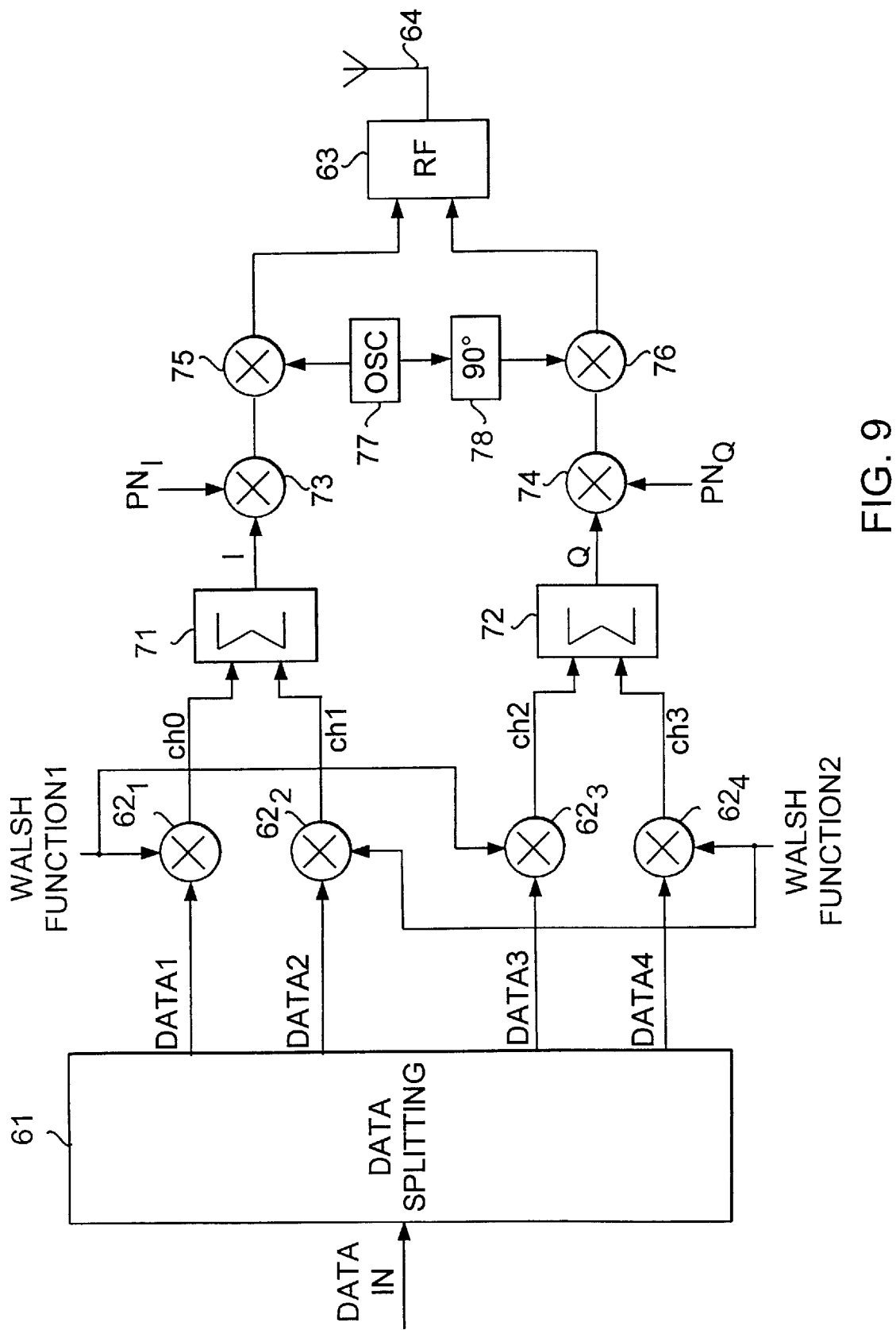
FIG. 9 shows a CDMA transmitter in which four CDMA traffic channels can be divided between quadrature (Q) and in-phase (I) branches in a QPSK modulator.

The RF parts 63 and 66 normally comprise transmitting and receiving filters. Often also a QPSK (Quadrature Phase Shift Keying) modulator is used. FIG. 9 shows an example of how four channels can be divided between quadrature (Q) and in-phase (I) branches in a QPSK modulator. High-speed data signal DATAIN is split into slow-speed data streams DATA1 . . . DATA4 and fed to multipliers $62_1$ . . . $62_4$ (Walsh encoders), respectively. In multipliers $62_1$ and $62_3$, data streams DATA1 and DATA3 are multiplied by Walsh funtion 1. Similarly, in multipliers $62_2$ and $62_4$ data streams DATA2 and DATA4 are multiplied by Walsh funtion 2. The outputs of multipliers $62_1$ and $62_2$ are summed in summing block 71, and fed to the I branch of the QPSK modulator. The outputs of multipliers $62_3$ and $62_4$ are summed in summing block 72, and fed to the Q branch of the QPSK modulator. The signals of the I and Q branches are multiplied by different spreading codes $PN_I$ and $PN_Q$ in multipliers 73 and 74, respectively. The actual spreading is done by these "outer" spreading codes. The resulting I and Q signals multiplied by the in-phase (from local oscillator 77) and quadrature (via 90 degree phase shifter 78 from the oscillator 77) oscillator signals, and fed through other RF parts 63 to antenna 64.

Even though the invention is described above with reference to certain embodiments, it should be understood, however, that the description is only exemplary and it may be varied and modified without deviating from the spirit and scope of the invention defined in the appended claims.

We claim:

1. A method for high-speed data transmission over a air interface between a mobile station and a fixed mobile communication network in a digital mobile communication system, said method comprising steps of:

allocating n parallel rate-adapted traffic channels to a high-speed user data signal, which requires a data rate $R_{user}$ within a range $(n-1)*R_{ch}<R_{user}<n*R_{ch}$, wherein $R_{ch}$ is the maximum transmission rate of any one of said traffic channels, and n=2,3, . . . , dividing the high-speed user data signal into transmission frames for transmission via said parallel traffic channels in such a way that all the information bits in the transmission frames of n−1 traffic channels carry user data bits, and the user data transfer rate of each of said n−1 traffic channels being $R_{ch}$, and a number of the information bits carrying user data bits in transmission frames of said nth traffic channel corresponds to the user data transfer rate $R_{user}-(n-1)*R_{ch}$ left over from the other n−1 traffic channels, and the remaining information bits in the transmission frames of said nth traffic channel carry stuff bits, and transmitting said transmission frames over the radio path between a mobile station and a fixed mobile network through said allocated rate-adapted traffic channels.

2. A method for high-speed data transmission over an air interface between a mobile station and a fixed mobile communication network in a digital mobile communication system, said method comprising steps of:

allocating n parallel rate-adapted traffic channels to a high-speed user data signal, which requires a data rate $R_{user}$ within a range $(n-1)*R_{ch}<R_{user}<n*R_{ch}$, wherein $R_{ch}$ is the maximum transmission rate of any one of said traffic channels, and n=2,3, . . . , dividing the high-speed user data signal into transmission frames for transmission via said parallel traffic channels in such a way that all the information bits in the transmission frames of n−1 traffic channels carry user data bits, and the user data transfer rate of each of said n−1 traffic channels being $R_{ch}$, and a number of the information bits carrying user data bits in transmission frames of said nth traffic channel corresponds to the user data transfer rate $R_{user}-(n-1)*R_{ch}$ left over from the other $n-_1$ traffic channels, and the remaining information bits in the transmission frames of said nth traffic channel carry stuff bits, and transmitting said transmission frames over the radio path between a mobile station and a fixed mobile network through said allocated rate-adapted traffic channels, said digital mobile communication system being a code division multiple access (CDMA) system, and said traffic channels being CDMA traffic channels.

3. A method according to claim 2, wherein said CDMA traffic channels are distinguished from each other by different spreading codes.

4. A method according to claim 2, wherein said traffic channels are distinguished from each other by different Walsh functions, comprising at least one mobile station having a data transmitter and a data receiver, a mobile communications network having a data transmitter and a data receiver, the mobile network being arranged to allocate n parallel rate-adapted traffic channels to a mobile station for transmission of a high-speed data signal over an air interface between said mobile station and said mobile communication network, when a data transfer rate $R_{user}$ required by said high speed data signal is within range $(n-1)*R_{ch}<R_{user}<n*R_{ch}$, wherein $R_{ch}$ is the maximum transmission rate of an individual traffic channel and $n=2,3,\ldots$, said data transmitters being arranged to divide the high-speed user data signal into transmission frames for transmission via said allocated parallel traffic channels in such a way that all the information bits in the transmission frames of n−1 traffic channels carry user data bits, and the user data transfer rate of each of said n−1 traffic channel being $R_{ch}$, and a number of the information bits carrying user data bits in the transmission frames of the nth traffic channel corresponds to the user data transfer rate $R_{user}-(n-1)*R_{ch}$ left over from the other n−1 traffic channels, and the remaining information bits in the transmission frames of said nth traffic channel carry stuff bits.

5. A digital mobile communication system, comprising:

at least one mobile station having a data transmitter and a data receiver, and a mobile communications network having a data transmitter and a data receiver, the mobile network being arranged to allocate n parallel rate-adapted traffic channels to a mobile station for transmission of a high-speed data signal over an air interface between said mobile station and said mobile communication network, when a data transfer rate $R_{user}$ required by said high speed data signal is within range $(n-1)*R_{ch}<R_{user}<n*R_{ch}$, wherein $R_{ch}$ is the maximum transmission rate of an individual traffic channel and $n=2,3,\ldots$, said data transmitters being arranged to divide the high-speed user data signal into transmission frames for transmission via said allocated parallel traffic channels in such a way that all the information bits in the transmission frames of n−1 traffic channels carry user data bits, and the user data transfer rate of each of said n−1 traffic channel being $R_{ch}$, and a number of the information bits carrying user data bits in the transmission frames of the nth traffic channel corresponds to the user data transfer rate $R_{user}-(n-1)*R_{ch}$ left over from the other n−1 traffic channels, and the remaining information bits in the transmission frames of said nth traffic channel carry stuff bits.

6. A digital mobile communication system, comprising:

at least one mobile station having a data transmitter and a data receiver, and a mobile communications network having a data transmitter and a data receiver, the mobile network being arranged to allocate n parallel rate-adapted traffic channels to a mobile station for transmission of a high-speed data signal over an air interface between said mobile station and said mobile communication network, when a data transfer rate $R_{user}$ required by said high speed data signal is within range $(n-1)*R_{ch}<R_{user}<n*R_{ch}$, wherein $R_{ch}$ is the maximum transmission rate of an individual traffic channel and $n=2,3,\ldots$, said data transmitters being arranged to divide the high-speed data signal into transmission frames for transmission via said allocated parallel traffic channels in such a way that all the information bits in the transmission frames of n−1 traffic channels carry user data bits and the user data transfer rate of each of said n−1 traffic channel being $R_{ch}$, and a number of the information bits carrying user data bits in the transmission frames of the nth traffic channel corresponds to the user data transfer rate $R_{user}-(n-1)*R_{ch}$ left over from the other n−1 traffic channels, and the remaining information bits in the transmission frames of said nth traffic channel carry stuff bits, said digital mobile communication system being a code division multiple access (CDMA) system, and said traffic channels being CDMA traffic channels.

7. A system according to claim 6, wherein said CDMA traffic channels are distinguished from each other by different spreading codes.

8. A system according to claim 6, wherein said traffic channels are distinguished from each other by different Walsh functions.

9. A system according to claim 5, wherein the maximum transmission rate $R_{ch}$ of the traffic channel is 9.6 Kbps.

10. A mobile station for a digital mobile communication system having capability of allocating n parallel rate-adapted traffic channels to a mobile station for transmission of a high-speed data signal over an air interface between said mobile station and said mobile communication network, when a data transfer rate $R_{user}$ required by said high speed data signal is within range $(n-1)*R_{ch}<R_{user}<n*R_{ch}$, wherein $R_{ch}$ is the maximum transmission rate of an individual traffic channel and $n=2,3,\ldots$, said mobile station comprising:

a data transmitter and a data receiver, said data transmitter being arranged to divide the high-speed user data signal into transmission frames for transmission via said allocated parallel traffic channels in such a way that all the information bits in the transmission frames of n−1 traffic channels carry user data bits, and the user data transfer rate of each of said n−1 traffic channel being $R_{ch}$, and a number of the information bits carrying user data bits in the transmission frames of the nth traffic channel corresponds to the user data transfer rate $R_{user}-(n-1)*R_{ch}$ left over from the other n−1 traffic channels, and the remaining information bits in the transmission frames of said nth traffic channel carry stuff bits.

11. A mobile station for a digital mobile communication system having capability of allocating n parallel rate-adapted traffic channels to a mobile station for transmission of a high-speed data signal over an air interface between said mobile station and said mobile communication network, when a data transfer rate $R_{user}$ required by said high speed data signal is within range $(n-1)*R_{ch}<R_{user}<n*R_{ch}$, wherein $R_{ch}$ is the maximum transmission rate of an individual traffic channel and $n=2,3,\ldots$, said mobile station comprising:

a data transmitter and a data receiver, said data transmitter being arranged to divide the high-speed user data signal into transmission frames for transmission via said allocated parallel traffic channels in such a way that all the information bits in the transmission frames of n−1 traffic channels carry user data bits, and the user data transfer rate of each of said n−1 traffic channel being $R_{ch}$, and a number of the information bits carrying user data bits in the transmission frames of the nth traffic channel corresponds to the user data transfer rate $R_{user}-(n-1)*R_{ch}$ left over from the other n−1 traffic channels, and the remaining information bits in the transmission frames of said nth traffic channel carry stuff bits, said digital mobile communication system being a code division multiple access (CDMA) system, and said traffic channels being CDMA traffic channels.

12. A mobile station according to claim 11, wherein said CDMA traffic channels are distinguished from each other by different spreading codes.

13. A mobile station according to claim 11, wherein said traffic channels are distinguished from each other by different Walsh functions.

14. A method for high-speed transmission over an air interface between a mobile station and a fixed mobile communication network in a digital mobile communication system, said method comprising:

allocating n parallel traffic channels for a high-speed data transmission over said air interface between said mobile station and said fixed mobile communication network, wherein n is at least 2, rate-adapting each of said traffic channels individually for a transmission rate $R_{ch}$, providing a high-speed user data signal requiring a data rate $R_{user}$ which is within a range $(n-1)*R_{ch}<R_{user}<n*R_{ch}$, but unequal to a multiple of $R_{ch}$, dividing the high-speed user data signal into transmission frames for transmission via said n parallel traffic channels so that in a majority of said transmission frames all information bits are carrying user data and so that information bits in a minority of said transmission frames are carrying both user both data and stuff bits, transmitting ones of said transmission frames in which all of said information bits carry user data bits over n−1 of said parallel traffic channels so that a user data rate $(n-1)*R_{ch}$ is transmitted over said n−1 traffic channels, transmitting ones of said transmission frames in which said information bits carry user data and stuff bits over said nth traffic channel of said n traffic channels so that a user data rate $R_{user}-(n-1)*R_{ch}$ is transmitted over said nth traffic channel while a total transmission rate of the nth traffic channel is $R_{ch}$.

15. A method for high-speed transmission over an air interface between a mobile station and a fixed mobile communication network in a digital mobile communication system, said method comprising:

allocating n parallel traffic channels for a high-speed data transmission over said air interface between said mobile station and said fixed mobile communication network, wherein n is at least 2, carrying out a rate-adaptation according to a CCITT specification V.110 to each of said traffic channels individually for a transmission rate $R_{ch}$, providing a high-speed user data signal requiring a data rate $R_{user}$ which is within a range $(n-1)*R_{ch}<R_{user}<n*R_{ch}$, but unequal to a multiple of $R_{ch}$, dividing the high-speed user data signal into transmission frames for transmission via said n parallel traffic channels so that in a majority of said transmission frames all information bits are carrying user data and so that information bits in a minority of said transmission frames are carrying both user data and stuff bits, transmitting ones of said transmission frames in which all of said information bits carry user data bits over n−1 of said parallel traffic channels so that a user data rate $(n-1)*R_{ch}$ is transmitted over said n−1 traffic channels, transmitting ones of said transmission frames in which said information bits carry user data and stuff bits over the nth traffic channel of said n traffic channels so that a user data rate $R_{user}-(n-1)*R_{ch}$ is transmitted over said nth traffic channel while a total transmission rate of the nth traffic channel is $R_{ch}$.

* * * * *